(12) United States Patent
Ferenczi (10) Patent No.: US 11,165,579 B2
(45) Date of Patent: *Nov. 2, 2021

(54) DECENTRALIZED DATA AUTHENTICATION

(71) Applicant: American Express Travel Related Services Company, New York City, NY (US)

(72) Inventor: Andras L. Ferenczi, Peoria, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 195 days.

This patent is subject to a terminal disclaimer.

(21) Appl. No.: 16/555,638

(22) Filed: Aug. 29, 2019

(65) Prior Publication Data

US 2021/0067340 A1 Mar. 4, 2021

(51) Int. Cl.
*H04L 9/32* (2006.01)
*G06F 16/27* (2019.01)
*G06F 21/60* (2013.01)
*H04L 9/08* (2006.01)
*H04L 9/30* (2006.01)

(52) U.S. Cl.
CPC ............ *H04L 9/3213* (2013.01); *G06F 16/27* (2019.01); *G06F 21/602* (2013.01); *H04L 9/0825* (2013.01); *H04L 9/30* (2013.01); *H04L 9/3247* (2013.01)

(58) Field of Classification Search
CPC ....... H04L 9/3213; H04L 9/0825; H04L 9/30; H04L 9/3247; G06F 16/27; G06F 21/602
See application file for complete search history.

(56) References Cited

U.S. PATENT DOCUMENTS

| 10,735,398 | B1* | 8/2020 | Covati | H04W 12/065 |
| 2010/0031022 | A1* | 2/2010 | Kramer | G06F 21/6218 713/155 |
| 2011/0131339 | A1* | 6/2011 | Brown | G06F 21/6218 709/229 |
| 2012/0159177 | A1* | 6/2012 | Bajaj | H04L 63/08 713/176 |
| 2014/0331282 | A1* | 11/2014 | Tkachev | G06F 21/31 726/3 |
| 2019/0306159 | A1* | 10/2019 | Agarwal | H04L 9/321 |

FOREIGN PATENT DOCUMENTS

KR 1020110122432 11/2011

* cited by examiner

*Primary Examiner* — Yonas A Bayou
(74) *Attorney, Agent, or Firm* — Thomas Horstemeyer, LLP (57) ABSTRACT

Disclosed are various embodiments for decentralizing the authentication or verification of data. An identity key can be generated for a data item. A request can then be sent to an authentication service for authentication of the data item, the request comprising the identity key and the data item. A verified claim for the data item can then be received in response. Subsequently, an identity document is generated, the identity document comprising the identity key for the data item and the verified claim. Finally, the identity document can be stored in a distributed ledger.

20 Claims, 8 Drawing Sheets

DECENTRALIZED DATA AUTHENTICATION

BACKGROUND

Many security threats rely on deceiving users into believing they are accessing data provided by a trusted source. In reality, the user often finds that the data itself is or includes malware. Other times, accessing the data triggers the installation of malware on the computing device of the user.

For example, a common security threat is known as phishing, whereby a malicious actor (the "phisher") creates a fake website that is visually indistinguishable from a valid website. When individuals visit the fake website, their data may be harvested or malware may be loaded onto their browser in an attempt to exploit their computer. To guide targets to visit the fake website, the phisher may create links with network addresses that are similar to or appear to be related to network addresses for the valid website.

As a similar example, another common security threat is the distribution of files that contain malware. The malware files may be disguised as legitimate files that a user would normally open, interact with, or consume, such as a spreadsheet, presentation, report, audio file, image file, or video file. The files may also be disguised or presented as being authored or created by a trusted entity. As a result, a user could be tricked into opening a file that he or she believes is a harmless file originating from a trusted source, when in reality the user is causing malware to be loaded onto his or her computer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for authenticating data or content or verifying the identity of content authors, originators, or distributors. Documents used to verify data or content can be stored in a decentralized manner. Decentralization protects against a single point of failure in the authentication or verification process. For example, if a certificate authority suffered a security breach or became inaccessible, authentication approaches that relied on a certificate authority to verify a certificate associated with content or data would fail until the certificate authority were secured or became accessible again. In contrast, a decentralized approach to authentication data or content or verifying the identity of content authors, originators, or distributors is more resilient and is unlikely to become unavailable in various situations. Moreover, decentralized approaches prevent a single entity, such as an operator of a certificate authority, from monopolizing or controlling the process of authenticating data or content or verifying the identity of content authors, originators, or distributors. In the following discussion, a general description of the system and its components is provided, followed by a discussion of the operation of the same.

Figure 1:
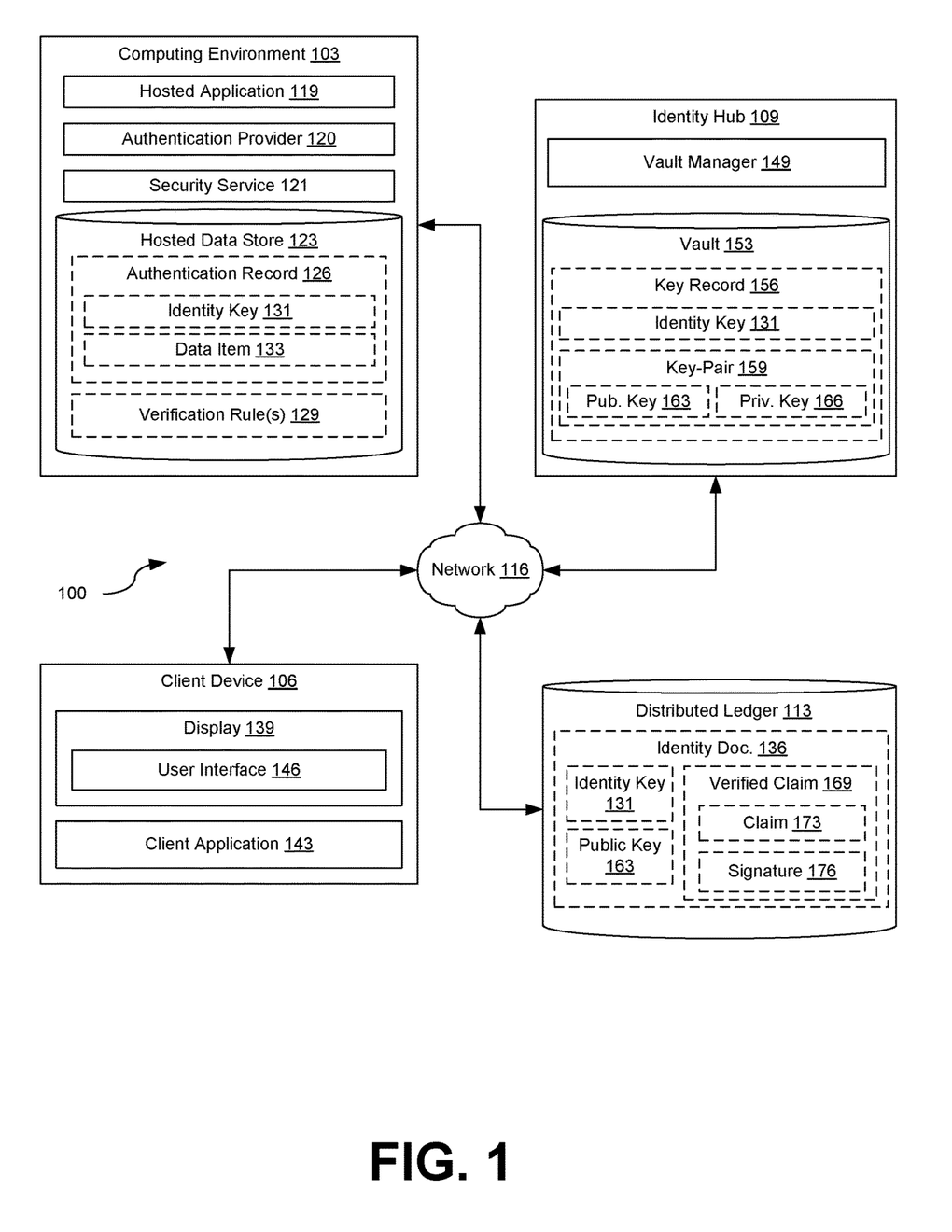
FIG. 1 is a drawing of a network environment according to various embodiments of the present disclosure.

As illustrated in FIG. 1, shown is a network environment 100 according to various embodiments. The network environment 100 includes a computing environment 103, a client device 106, an identity hub 109, and a distributed ledger 113, which are in data communication with each other via a network 116. The network 116 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 116 can also include a combination of two or more networks 116. Examples of networks 116 can include the Internet, intranets, extranets, virtual private networks (VPNs), and similar networks.

The computing environment 103 can include a server computer or any other system providing computing capability. Alternatively, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various embodiments. The components executed on the computing environment 103 include a hosted application 119, a security service 121, and other applications, services, processes, systems, engines, or functionality not discussed in detail herein. While the hosted application 119 and the security service 121 are depicted as operating in the same computing environment, it is understood that that the hosted application 119 and the security service 121 could be operated or executed in separate computing environments. Similarly, the hosted application 119 and the security service 121 could be operated and controlled by the same entity or by different entities, depending on the particular implementation.

The hosted application 119 can be executed to provide access to users to data stored in the hosted data store 123 or to perform one or more functions or initiate one or more transactions on behalf of a user. Examples of hosted applications 119 include web servers, mail servers, file servers, which may be used to provide for web-based applications such as electronic banking applications, electronic commerce or shopping applications, social media applications, internet or web-based electronic mail (webmail) applications, file-sharing applications or services, internet or web-based productivity applications (e.g., word-processors, spreadsheets, presentation applications, etc.), media streaming applications, etc. However, any application hosted by computing environment 103 which provides client devices 106 with content, access to content, or resolvable network addresses where data or content may be access can be considered a hosted application 119 for the purposes of the various embodiments of the present disclosure.

The authentication provider 120 can be executed to authenticate or verify the identity of a user or entity. This can include authenticating or otherwise verifying that a particular service, application, or device is operated or controlled by the user or entity. For example, the authentication provider 120 could be executed to determine that a website available at a particular network address (e.g., http://www.examplebank.com) is, in fact, operated by the company "ExampleBank."

The security service 121 can be executed to evaluate the security or authenticity of a resource. This can include, for example, verifying or certifying the authenticity of files, network addresses, or other data, as well as verifying or certifying the authenticity of the creator or provider of the files, network addresses or other data. For example, the security service 121 could be executed to evaluate whether a file was created or distributed by a particular person or organization. As another example, the security service 121 could be executed to evaluate whether a link or network address is actually for a resource under control of a particular entity. For instance, the security service 121 could determine whether a link for a banking website is actually a link to the real website of a bank or is instead a link to an impostor website. The security scanner 121 could also be executed to evaluate whether a file includes malware or whether a website available at a network address has security vulnerabilities. These evaluations can be performed automatically in response to receiving a file or network address or in response to a request received by another application.

Also, various data can be stored in a hosted data store 123 that is accessible to the computing environment 103. The hosted data store 123 can be representative of a plurality of hosted data stores 123, which can include relational databases, object-oriented databases, hierarchical databases, hash tables or similar key-value data stores, as well as other data storage applications or data structures. The data stored in the hosted data store 123 is associated with the operation of the various applications or functional entities described below. This data can include one or more authentication records 126 and one or more verification rules 129.

An authentication record 126 can represent a relationship between an identity key 131 and a data item 133. The relationship may be stored, for example, in order to use the identity key 131 to verify assertions about the data item 133 made based at least in part on one or more verification rules 129.

An identity key 131 can represent a unique address that specifies the location where an identity document 136 can be found, such as a network address that specifies a network location of the identity document 136. The identity key 131 can include the storage location where the identity document 136 can be found, a unique identifier of the identity document 136, and potentially other information. As the identity key 131 can uniquely identity the identity document 136 with respect to other identity documents 136, the identity key 131 can also be used as a unique identifier for an individual, entity, organization, or data item 133. An illustrative example of an identity key 131 is a decentralized identifier (DID) as defined by the World Wide Web Consortium (W3C). However, data formats can be used as an identity key 131 in various embodiments of the present disclosure.

In the example of a DID, the identity key 131 can include a unique uniform resource identifier (URI) or unique uniform resource locator (URL) that specifies the type of identity key 131, the specific distributed ledger 113 in which an identity document 136 can be located, and a identifier of the identity document 136. For example, if an identity document 136 were stored using an implementation of the ETHEREUM protocol, an identity key 131 formatted as a DID has an example URL or URI schema of "did:ethereum:123456abcdefg." This example identity key 131 could then be used as the key for retrieving the identity document 136 from the distributed ledger 113.

A data item 133 can include any digital representation of data. For example, a data item 133 could be a file or a data stream. As another example, a data item 133 could be an address at which a file, application, or webpage is located (e.g., a URL, URI, or similar link or network address).

A verification rule 129 can represent a compliance rule or policy used as the basis for an assertion regarding a particular data item 133 or class of data items 133. For example, a verification rule 129 may specify the requirements for making an assertion that a data item 133 is secure. This include a requirement that a website pass a security scan performed by the security service 121 or that a file be confirmed by the security service 121 to not include malware. As another example, a verification rule 129 may specify the requirements for making the assertion regarding the owner or creator of a data item 133, such as the requirements for determining that a particular website owner is the originator of a particular link.

The client device 106 is representative of a plurality of client devices that can be coupled to the network 116. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 139, such as liquid crystal displays (LCDs), gas plasma-based flat panel displays, organic light emitting diode (OLED) displays, electrophoretic ink ("E-ink") displays, projectors, or other types of display devices. In some instances, the display 139 can be a component of the client device 106 or can be connected to the client device 106 through a wired or wireless connection.

The client device 106 can be configured to execute various applications such as a client application 143 or other applications. The client application 143 can be executed by the client device 106 to access network content served up by the computing environment 103 or other servers, thereby rendering a user interface 146 on the display 139. To this end, the client application 143 can include a browser or a dedicated application (e.g., email applications, social networking applications, messaging applications, banking applications, shopping applications, etc.), and the user interface 146 can include a network page, an application screen, other user mechanism for obtaining user input.

The identity hub 109 can represent a service or collection of services hosted by one or more computing devices and utilized to securely store identity documentation for individual users and provide the identity documentation in response to authorized requests. For example, the identity hub 109 can include a credential manager 149 and a vault 153. Although the identity hub 109 is depicted as separate from the computing environment 103 for clarity, it is understood that the functions of the identity hub 109, including the vault manager 149 and the vault 153, could be implemented within the computing environment 103. Moreover, in some implementations, the identity hub 109, including the vault manager 149 and the vault 153, could be operated by the same entity or different entities, depending on the particular implementation.

The vault manager 149 can be executed to control access to the vault 153. For example, the vault manager 149 can be used to add, remove, or modify various data stored in the vault 153. As another example, the vault manager 149 can be used to authenticate individual users and limit access to the vault 153 to authorized users or entities.

The vault 153 represents a secure data store accessible to the credential manager 149. Data stored in the vault 153 can be stored in an encrypted form that is accessible only to individual users or entities. An individual user or entity can store various types of data in the vault 153, including one or more key records 156. The key record 156 can be used to track an association or relationship between a particular identity key 131 and a respective key-pair 159.

The key-pair 159 can represent an asymmetric cryptographic key-pair that includes a public key 163 and a private key 166. The cryptographic keys in the key-pair 159 can be used by an entity or user to confirm or otherwise authenticate their relationship with or control over data associated with the identity key 131, as described later. The key-pair 159 can be generated using various approaches, such as elliptic curve cryptography (ECC) approaches or using the Rivest-Shamir-Adleman (RSA) algorithm.

The distributed ledger 113 represents a synchronized, eventually consistent, data store spread across multiple nodes in different geographic or network locations. Each node in the distributed ledger 113 can contain a replicated copy of the distributed ledger 113, including all data stored in the distributed ledger 113. Records of transactions involving the distributed ledger 113 can be shared or replicated using a peer-to-peer network connecting the individual nodes that form the distributed ledger 113. Once a transaction or record is recorded in the distributed ledger 113, it can be replicated across the peer-to-peer network until the record is eventually recorded with all nodes. Various consensus methods can be used to ensure that data is written reliably to the distributed ledger 113. Examples of a distributed ledger can include blockchains, distributed hash tables (DHTs), and similar data structures.

Various data can also be stored in a distributed ledger 113. This can include one or more identity documents 136. However, any other data discussed in the present disclosure could also be stored in the distributed ledger 113 if the public availability of the data were acceptable in that particular implementation.

An identity document 136 is a document that provides information for identifying and authenticating a user. An identity document 136 can include an identity key 131, which can be used to uniquely identify the identity document 136 and, therefore, the individual or entity associated with the identity document 136. An identity document 136 can also include a public key 163 from the asymmetric key-pair 159 associated with the identity key 131, which can used by third-parties to verify the authenticity of the identity document 136. The identity document 136 can also include one or more verified claims 169. An illustrative example of an identity document 163 is a decentralized identifier document (DID Document) as defined by the W3C. However, data formats can be used as an identity document 163 in various embodiments of the present disclosure.

A verified claim 173 represents one or more verified assertions about a specific entity or data item 133 described by the identity document 136. For example, the assertion could be that a data item 133 complies with one or more verification rules 129 (e.g., that a file does not include malware or that a link to a website is a valid link from the operator of the website). As another example, the assertion could be that a particular entity is who they claim to be or that the originator of content or author of a communication is who they purport to be. Accordingly, the verified claim 169 could include one or more claim 173 and respective signatures 176 for each claim 173.

The claim 173 represents the assertion about an entity, individual, or data item 133. For example, a claim 173 could state that a website located at a particular network address is considered secure according to the criteria set forth in one or more verification rules 129. For instance, the claim 173 could specify that a website does not include any known security vulnerabilities or does not contain any known malware. As another example, the claim 173 could specify that a network address directing a user to a network service, such as a website or web application, is an authentic or valid network address provided by the operator of the website or web application. Similarly, the claim 173 could specify that a file does not contain malware or that the creator of the file is who they purport to be.

The signature 176 can include any cryptographic signature used to verify the veracity and authenticity of the claim 173. For example, the signature 176 can identify the party making the assertion and also include both a digital signature generated by a private encryption key 166 in possession of the party entity and a digital fingerprint identifying the corresponding public encryption key 163 that can be used to verify the signature 176. The signature 176 can also be used to determine whether the claim 173 has been modified without the consent of the entity making the claim 173. For example, an unauthorized change to the claim 173 would result in a mismatch between the signature 176 and the claim 173.

Next, a general description of the operation of the various components of the network environment 100 is provided. A more detailed description of the operation of individual components is provided in the discussion of FIGS. 2-7. Moreover, while the following description provides one example of the interactions between the various components depicted in the network environment 100 of FIG. 1, they can be configured to operate in other manners, as discussed later.

To begin, the authentication provider 120 can first verify the identity of the hosted application 119, which can include verifying the identity of the operator of the hosted application 119. Accordingly, the hosted application 119 can either generate a key-pair 159 that will be used for authenticating the identity of the hosted application 119 or use a preexisting key-pair 159 previously created for that purpose. The hosted application 119 can also generate a new identify key 131 that can be used for authenticating or verifying the identity of the hosted application 119.

Next, the hosted application 119 can send the identity key 131 to the authentication provider 120 and authentication information for the hosted application 119 to verify or authenticate its identity. These authentication credentials could include a username and password, cryptographic certificates, a public key 163 from a preexisting key-pair 159, previously issued authentication tokens or cookies, biometric credentials, etc.

The authentication provider 120 can then authenticate the identity of the hosted application 119 using the authentication credentials. This could include verifying the username and password, issuing a cryptographic challenge using the certificate or public key 163 and verifying the cryptographic response, verifying the previously issued authentication tokens or cookies, etc. Once the identity of the hosted application 119 is verified, the authentication provider 120 can create a verified claim 169 containing a claim 173 asserting the identity of the operator of the hosted application 119 and a signature 176 for the claim 173. The verified claim 169 can then be returned to the hosted application 119, which can create and store an identity document 136 in the distributed ledger containing the verified claim 169, the identity key 131, and the public key 163 to be used by the hosted application 119 to prove its identity.

Subsequently, the hosted application 119 can request that the security service 121 validate a data item 133, such as a file or a network address (e.g., a URL specifying a website or a web application). The validation could be to certify that the hosted application 119 is the originator for the data item 133 (e.g., the creator or distributor of a file or the host of a website or web application identified by a network address), or that the data item 133 is secure (e.g., that a file does not contain known malware or that a web site or web application located at a network address does not contain any known vulnerabilities). The request can include a newly generated key-pair 159 specific to the data item 133 and a newly created identity key 131 unique for the data item 133, as well as the identity key 131 used to verify the identity of the hosted application 119 itself.

Upon receipt of the request from the hosted application 119, the security service 121 can first verify the identity of the hosted application 119. For instance, the security service 121 can retrieve from the distributed ledger 113 the identity document 136 that that contains the verified claim 169 regarding the identity of the hosted application 119 and the public key 163 to be used to verify the identity of the hosted application 119. The security service 121 can then use the public key 163 to initiate a challenge-response exchange to verify the identity of the hosted application 119. In some instances, the security service 121 may use a relay service or resolution service to determine which distributed ledger 113 contains the identity document 136 in those implementations where multiple distributed ledgers 113 are used. An example of such a relay service or resolution service is a DID Resolver, as defined by the W3C.

Once the identity of the hosted application 119 is verified, the security service 121 can then validate the data item 133. For example, if the data item 133 is a network address (e.g., a URL) for a web site or web application, the security service 121 might first perform an automated threat assessment. The threat assessment could check for common web site misconfigurations or known server or application vulnerabilities. As another example, the security service 121 could verify that the network address was an authentic network address controlled by the operator of the web site or web application (e.g., instead of a network address pointing to a phishing site). If the data item 133 is a file, then the security service 121 might perform a malware scan to determine whether the file contains malware. As another example, the security service 121 could verify that the operator of the hosted application 119 is the creator or originator of the file. This could be done by verifying a cryptographic signature of the file created by the hosted application 119.

After validating the data item 133, the security service 121 can create one or more verified claims 169 related to the data item 133. For example, the security service 121 could create a verified claim 169 that contains a first claim 173 that a network address is controlled by the operator of the hosted application 119 and a second claim 173 that the web site or web application available at the network address contains no known security vulnerabilities. The security service 121 could also create a first signature 176 for the first claim 173 and a second signature 176 for the second claim 173 and include these signatures in the verified claim 169. However, the security service 121 could create multiple verified claims 169, each verified claim 169 representing a single claim 173. The security service 121 can then return the verified claim 169 for the data item 133 and, in some implementations, the identity key 131 associated with the data item 133.

Once the hosted application 119 receives the verified claim 169, it can create an identity document 136 that includes the identity key 131 associated with the data item 133, the verified claim 169 provided by the security service 121, and a public key 163 associated with the identity key 131. The hosted application 119 can then store the identity document 136 in a distributed ledger 113.

When the client application 143 requests a data item 133, it can use the identity document 136 stored in the distributed ledger 113 to validate or otherwise verify the security or authenticity of the data item 133. For example, if a browser requests a web page using a URL, the hosted application 119 may provide the identity key 131 related to the network address to the browser. The browser could then retrieve an identity document 136 for the URL, identify a verified claim 169 in the identity document 136 that includes a claim 173 that the URL is a valid network address for the web page provided by the hosted application 119, and verify the claim 173 using the public key 163 and signature 176. Similarly, the browser could identity a second claim 173 in the identity document 136 indicating that the web page has passed a recent security scan performed by the security service 121 and verify the claim 173 using the public key 163 and the signature 176. If the data item 133 were a file, the client application 143 could use a similar process to verify the authorship and security of the file.

Figure 2:
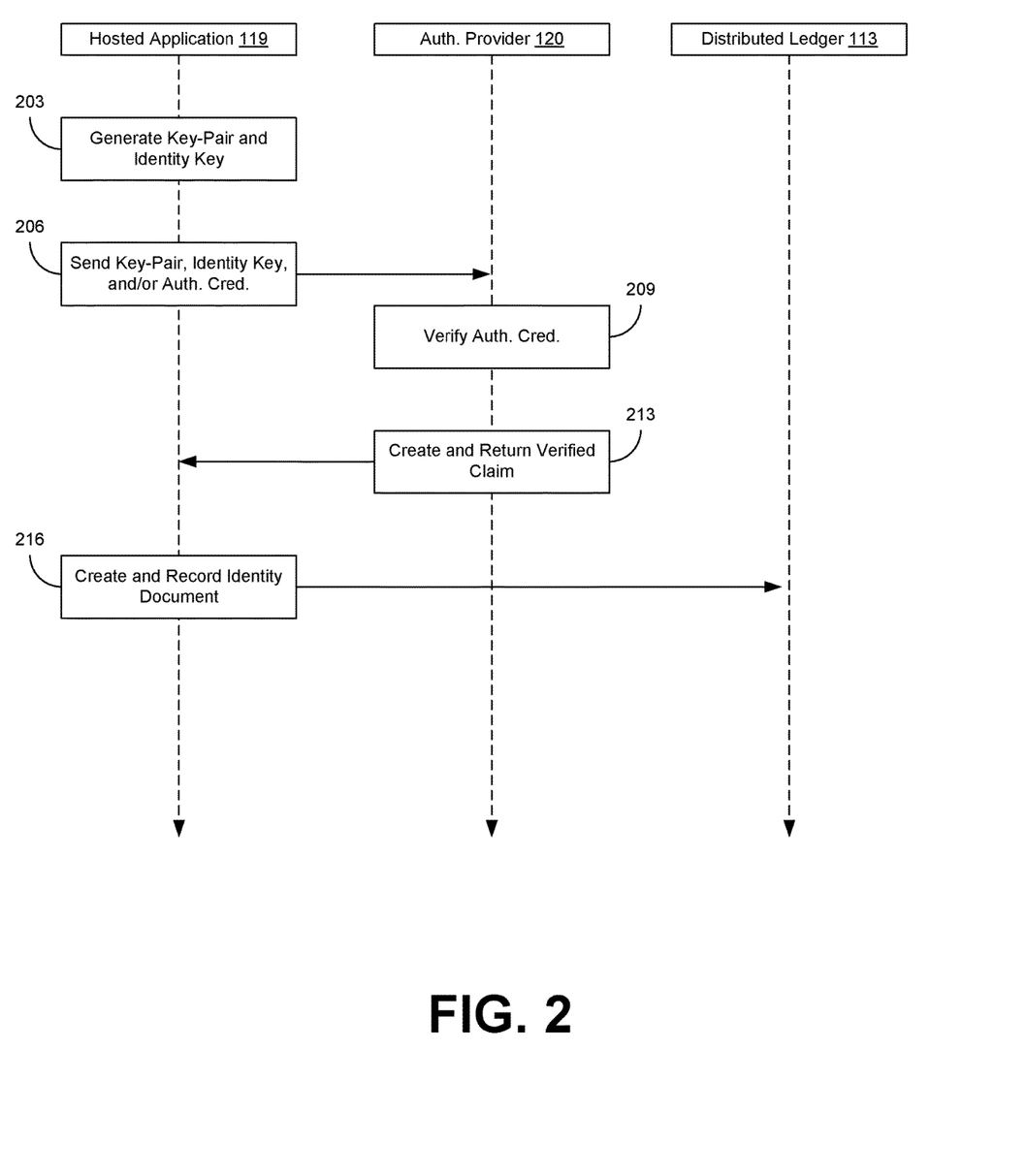
FIG. 2 is a sequence diagram illustrating one example of functionality implemented in the network environment of FIG. 1 according to various embodiments of the present disclosure.

Referring next to FIG. 2, shown is a sequence diagram that provides one example of the operation of the components of the network environment 100. It is understood that the sequence diagram of FIG. 2 provides merely an example of the many different types of functional arrangements that can be employed to implement the operation of the depicted portion of the network environment 100. As an alternative, the sequence diagram of FIG. 2 can be viewed as depicting an example of elements of a method implemented within the network environment 100.

Beginning with step 203, the hosted application 119 can generate both a key-pair 159 and an identity key 131 to be used for authenticating the identity of the hosted application 119 or the operator of the hosted application 119. After generating the key-pair 159 and the identity key 131, the hosted application 119 may store the key-pair 159 in the vault 153. Accordingly, the hosted application 119 can send a request, which can include authentication credentials for the hosted application 119 and the identity key 131 and key-pair 159, to the vault manager 149. After verifying the authentication credentials, the vault manager 149 can create a key-record in the vault 153 that associates the identity key 131 with the key-pair 159. Should the hosted application 119 require the private key 166 associated with the identity key 131, it can request a copy of or access to the private key 166 from the vault manager 149.

Then at step 206, the hosted application 119 can send the key-pair 159 and the identity key 131 to the authentication provider 120 for verification. In some implementations, the hosted application 119 can also send authentication credential(s) to the authentication provider 120 to prove the identity of the hosted application 119 itself or the operators of the hosted application 119.

Next at step 209, the authentication provider 120 verifies the authentication credential(s) provided by the hosted application 119. For example, the authentication provider 120 could verify that an authentication credential(s) provided by the hosted application 119, such as a user name and password; preshared secret, token, or cookie; or other authentication credential provided by the hosted application 119 match the authentication credential(s) already on file with the authentication provider 120.

Subsequently, at step 213, the authentication provider 120 can create and return a verified claim 169 to the hosted application 119 if the authentication credentials are determined to be valid at step 209. The verified claim 169 could include a claim 173 asserting that the authentication provider 120 has verified the identity of the hosted application 119 or the operator of the hosted application 119, including that the identity key 131 provided by the hosted application 119 is controlled by the hosted application 119 or the operator of the hosted application 119. The verified claim 169 could also include a respective signature 176 for each claim 173 included in the verified claim 169. The signature 176 could be generated by the authentication provider 120 using a private key 166 controlled by the authentication provider 120. As a result, third-parties could verify the claim 173 by comparing the signature 176 to the claim 173 using a respective public key 163 for the private key 166 controlled by the authentication provider 120. If the signature 176 could not be verified using the public key 163 of the authentication provider 120, this could indicate that the claim 173 has been altered without authorization or that the claim 173 was never made by the authentication provider 120. The verified claim 169 is then returned to the hosted application 119.

Next at step 216, the hosted application 119 can create an identity document 136 which can allow other applications or third-parties to verify the identity of the hosted application 119 or the operator of the hosted application 119. For example, the hosted application 119 can create an identity document 136 that includes the identity key 131 and the key-pair 159 created at step 203, as well as the verified claim 169 created at step 213. After creating the identity document 136, the hosted application 119 can cause the identity document 136 to be stored in distributed ledger 113.

Figure 3:
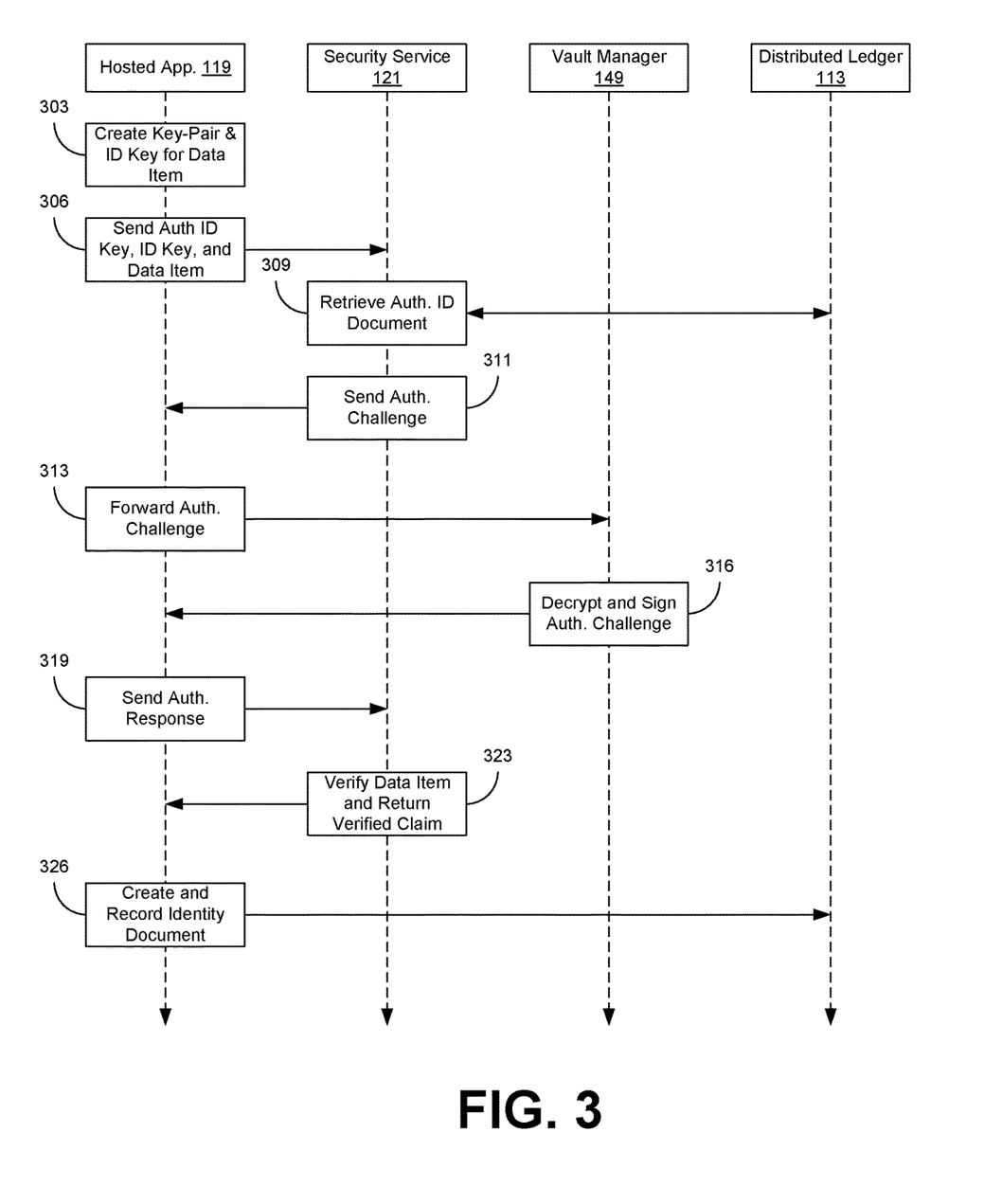
FIG. 3 is a sequence diagram illustrating one example of functionality implemented in the network environment of FIG. 1 according to various embodiments of the present disclosure.

Referring next to FIG. 3, shown is a sequence diagram that provides another example of the operation of the components of the network environment 100. It is understood that the sequence diagram of FIG. 3 provides merely an example of the many different types of functional arrangements that can be employed to implement the operation of the depicted portion of the network environment 100. As an alternative, the sequence diagram of FIG. 3 can be viewed as depicting an example of elements of a method implemented within the network environment 100.

Beginning with step 303, the hosted application 119 creates a key-pair 159 and an identity key 131 for a respective data item 133 (e.g., a file, a network address or other type of data). The relationship between the identity key 131 and the data item 133 may also be recorded in the hosted data store 123 as an authentication record 126, which can contain the identity key 131 and a copy of or identifier for the data item 133.

Next at step 306, the hosted application 119 can send a verification request to the security service 121. The verification request can include the identity key 131 associated with the data item 133, the data item 133 itself, and the identity key 131 that identifies the hosted application 119. In some instances the hosted application 119 can also provide an indication of one or more verification rules 129 to be considered when evaluating the data item 133.

Proceeding to step 309, the security service 121 retrieves the identity document 136 associated with the identity key 131 that identifies the hosted application 119 in response to receiving the verification request. For example, the security service 121 can use the identity key 131 to search for the respective identity document 136 stored in the distributed ledger 113 and retrieve it. In instances where multiple distributed ledgers 113 are used, the security service 121 can send the identity key 131 to a relay or resolver service, such as a DID resolver, to determine which distributed ledger 113 contains the identity document 136. In these instances, the relay or resolver service may retrieve the identity document 136 on behalf of the security service 121 and return it to the security service 121.

Moving on to step 311, the security service 121 can send an authentication challenge to the hosted application 119 to confirm that the hosted application 119 made the request at step 306. Accordingly, the security service 121 can use the public key 163 in the identity document 136 retrieved at step 309 to encrypt a token or nonce for use as an authentication challenge. The authentication challenge can then be sent to the hosted application 119.

Referring next to step 313, the hosted application 119 can forward the authentication challenge to the vault manager 149. The authentication challenge can be forwarded as part of a request for the vault manager 149 to decrypt and sign the authentication challenge using the private key 166 associated with the identity key 131 that authenticates the hosted application 119. The hosted application 119 may also include authentication credentials to confirm with vault manager 149 that the operation should be performed on behalf of the hosted application 119.

In response at step 316, the vault manager 149 can decrypt and sign the authentication challenge and provide the decrypted authentication challenge and signature for the authentication challenge to the hosted application 119. For example, the vault manager 149 can first retrieve the private key 166 of the key-pair 159 associated with the identity key 131 that identifies the hosted application 119. The vault manager 149 can then decrypt the encrypted challenge to recreate the original token or nonce provided by the security service 121. The vault manager 149 can then sign the token or nonce with the private key 166 to prove that the owner of the private key 166 for the hosted application 119 decrypted the challenge instead of obtaining the unencrypted token or nonce through other means. The vault manager 149 could then provide the unencrypted token or nonce as well as the respective signature to the hosted application 119.

Next at step 319, the hosted application 119 can send an authentication response to the security service 121 to prove its identity. This can include the unencrypted token or nonce from the authentication challenge as well as a signature for the unencrypted token or nonce.

Then at step 323, the security service 121 can verify or validate the data item 133. For example, the security service 121 can evaluate the data item 133 to determine whether the data item 133 complies with one or more verification rules 129 specified by the hosted application 119 in step 306. As another example, the security service 121 can identify a verification rule 129 that applies to the data item 133 and evaluate the data item 133 for compliance. For example, if the data item 133 is a network address for a website, the security service 121 could identify all verification rules 129 applicable to network addresses or websites and evaluate the data item 133 for compliance. Similarly, if the data item 133 is a file, the security service 121 could identify all verification rules 129 applicable to files and evaluate the data item for compliance.

Once the security service 121 evaluates the data item 133, the security service can create a verified claim 169 about the data item 133. This can include a claim 173 about each verification rule 129 with which the data item 133 complies. This can also include a claim 173 about each verification rule 129 with which the data item 133 fails to comply. For example, if the security service 121 determines that the network address is a valid network address for the hosted application 119 instead of a network address for an impostor application, the security service 121 could make a claim 173 that the network address complies with a verification rule 129 stating that a network address should be a valid network address for reaching the hosted application 119. However, if an automated security scan performed by the security service 121 indicate the present of vulnerabilities in the hosted application 119, the security service 121 could make a second claim that the hosted application 119 is insecure and fails to comply with a verification rule 129 that the hosted application 119 should be free of vulnerabilities or specific vulnerabilities. Similar claims 173 can also be made about files, such as the identity of the creator or distributor of a file or whether a file contains malware. The security service 121 can also create a respective signature 176 for each claim 173 in the verified claim 169. The verified claims 169 can then be returned to the hosted application 119.

Finally, at step 326, the hosted application 119 can create and record an identity document 136 for the data item 133 that includes the verified claims 169 provided by the security service 121. This can allow other applications or third-parties to verify the authenticity or security of data items 133, such as whether links to network addresses are genuine or fake, whether a hosted application 119, website, or file contains malware or is otherwise insecure, or whether an entity that purports to be the creator, originator, or distributor of a file is actually the creator, originator or distributor of the file. According, the hosted application 119 can create an identity document 136 that includes the identity key 131 and the key-pair 159 created at step 303, as well as the verified claims 169 created at step 323. After creating the identity document 136, the hosted application 119 can cause the identity document 136 to be stored in distributed ledger 113.

Figure 4:
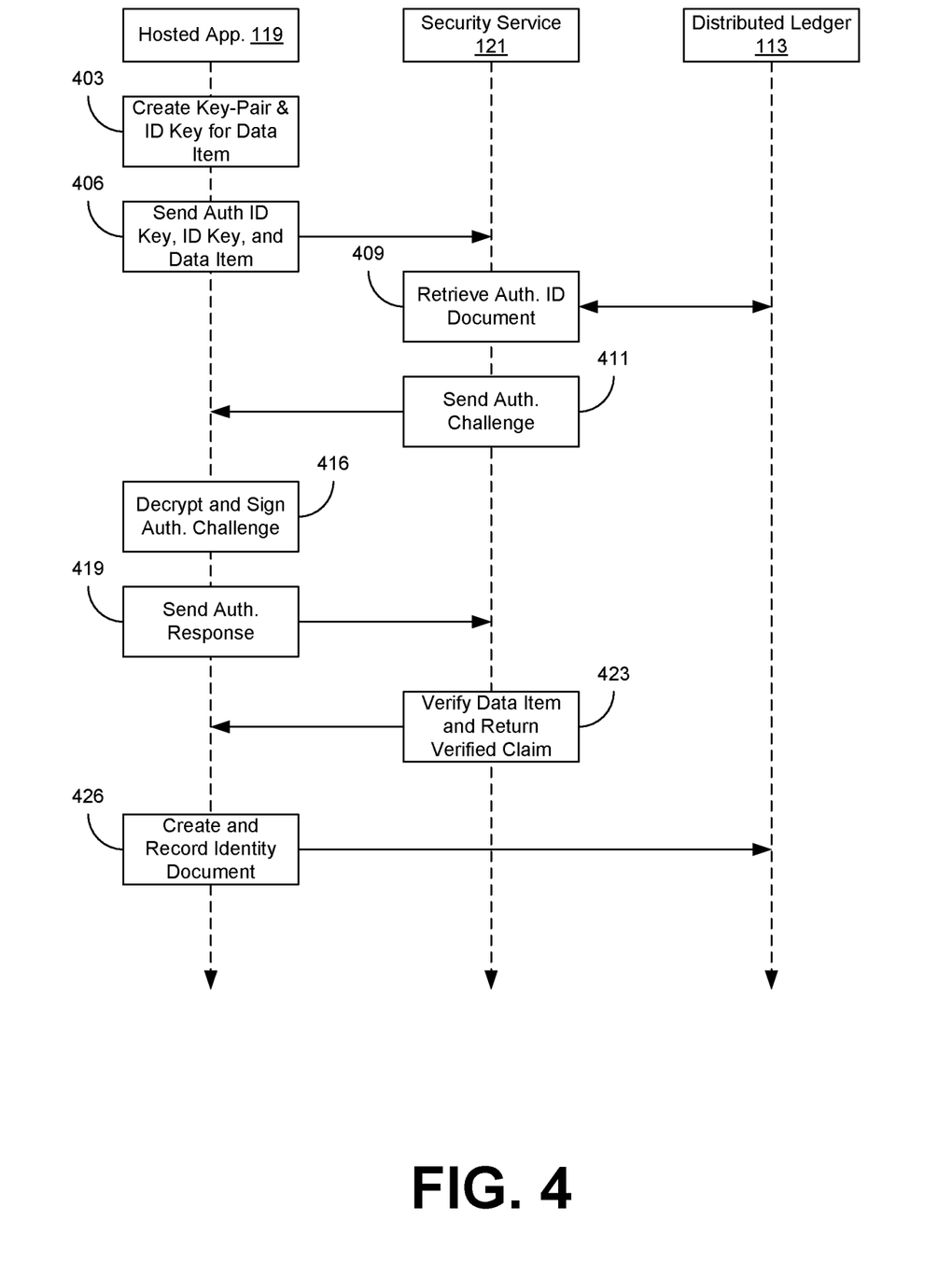
FIG. 4 is a sequence diagram illustrating one example of functionality implemented in the network environment of FIG. 1 according to various embodiments of the present disclosure.

Referring next to FIG. 4, shown is a sequence diagram that provides another example of the operation of the components of the network environment 100. It is understood that the sequence diagram of FIG. 4 provides merely an example of the many different types of functional arrangements that can be employed to implement the operation of the depicted portion of the network environment 100. As an alternative, the sequence diagram of FIG. 4 can be viewed as depicting an example of elements of a method implemented within the network environment 100.

It should be noted that the sequence diagram of FIG. 4 is similar in scope to that of FIG. 3. However, the sequence diagram of FIG. 3 depicts the use of a vault manager 149, while the sequence diagram of FIG. 4 depicts an alternative implementation which omits the use of the vault manager 149.

Beginning with step 403, the hosted application 119 creates a key-pair 159 and an identity key 131 for a respective data item 133 (e.g., a file, a network address or other type of data). The relationship between the identity key 131 and the data item 133 may also be recorded in the hosted data store 123 as an authentication record 126, which can contain the identity key 131 and a copy of or identifier for the data item 133.

Next at step 406, the hosted application 119 can send a verification request to the security service 121. The verification request can include the identity key 131 associated with the data item 133, the data item 133 itself, and the identity key 131 that identifies the hosted application 119. In some instances the hosted application 119 can also provide an indication of one or more verification rules 129 to be considered when evaluating the data item 133.

Proceeding to step 409, the security service 121 retrieves the identity document 136 associated with the identity key 131 that identifies the hosted application 119 in response to receiving the verification request. For example, the security service 121 can use the identity key 131 to search for the respective identity document 136 stored in the distributed ledger 113 and retrieve it. In instances where multiple distributed ledgers 113 are used, the security service 121 can send the identity key 131 to a relay or resolver service, such as a DID resolver, to determine which distributed ledger 113 contains the identity document 136. In these instances, the relay or resolver service may retrieve the identity document 136 on behalf of the security service 121 and return it to the security service 121.

Moving on to step 411, the security service 121 can send an authentication challenge to the hosted application 119 to confirm that the hosted application 119 made the request at step 406. Accordingly, the security service 121 can use the public key 163 in the identity document 136 retrieved at step 409 to encrypt a token or nonce for use as an authentication challenge. The authentication challenge can then be sent to the hosted application 119.

At step 416, the hosted application 119 can decrypt and sign the authentication challenge and provide the decrypted authentication challenge and signature for the authentication challenge to the hosted application 119. For example, the hosted application 119 can use a respective private key 166 of the key-pair 159 to decrypt the encrypted challenge to recreate the original token or nonce provided by the security service 121. The hosted application 119 can then sign the token or nonce with the private key 166 to prove that the hosted application 119 decrypted the challenge instead of obtaining the unencrypted token or nonce through other means.

Then at step 419, the hosted application 119 can send an authentication response to the security service 121 to prove its identity. This can include the unencrypted token or nonce from the authentication challenge as well as a signature for the unencrypted token or nonce.

In step 423, the security service 121 can verify or validate the data item 133. For example, the security service 121 can evaluate the data item 133 to determine whether the data item 133 complies with one or more verification rules 129 specified by the hosted application 119 in step 406. As another example, the security service 121 can identify a verification rule 129 that applies to the data item 133 and evaluate the data item 133 for compliance. For example, if the data item 133 is a network address for a website, the security service 121 could identify all verification rules 129 applicable to network addresses or websites and evaluate the data item 133 for compliance. Similarly, if the data item 133 is a file, the security service 121 could identify all verification rules 129 applicable to files and evaluate the data item for compliance.

Once the security service 121 evaluates the data item 133, the security service can create a verified claim 169 about the data item 133. This can include a claim 173 about each verification rule 129 with which the data item 133 complies. This can also include a claim 173 about each verification rule 129 with which the data item 133 fails to comply. For example, if the security service 121 determines that the network address is a valid network address for the hosted application 119 instead of a network address for an impostor application, the security service 121 could make a claim 173 that the network address complies with a verification rule 129 stating that a network address should be a valid network address for reaching the hosted application 119. However, if an automated security scan performed by the security service 121 indicate the present of vulnerabilities in the hosted application 119, the security service 121 could make a second claim that the hosted application 119 is insecure and fails to comply with a verification rule 129 that the hosted application 119 should be free of vulnerabilities or specific vulnerabilities. Similar claims 173 can also be made about files, such as the identity of the creator or distributor of a file or whether a file contains malware. The security service 121 can also create a respective signature 176 for each claim 173 in the verified claim 169. The verified claims 169 can then be returned to the hosted application 119.

Finally, at step 426, the hosted application 119 can create and record an identity document 136 for the data item 133 that includes the verified claims 169 provided by the security service 121. This can allow other applications or third-parties to verify the authenticity or security of data items 133, such as whether links to network addresses are genuine or fake, whether a hosted application 119, website, or file contains malware or is otherwise insecure, or whether an entity that purports to be the creator, originator, or distributor of a file is actually the creator, originator or distributor of the file. Accordingly, the hosted application 119 can create an identity document 136 that includes the identity key 131 and the key-pair 159 created at step 403, as well as the verified claims 169 created at step 423. After creating the identity document 136, the hosted application 119 can cause the identity document 136 to be stored in distributed ledger 113.

Figure 5:
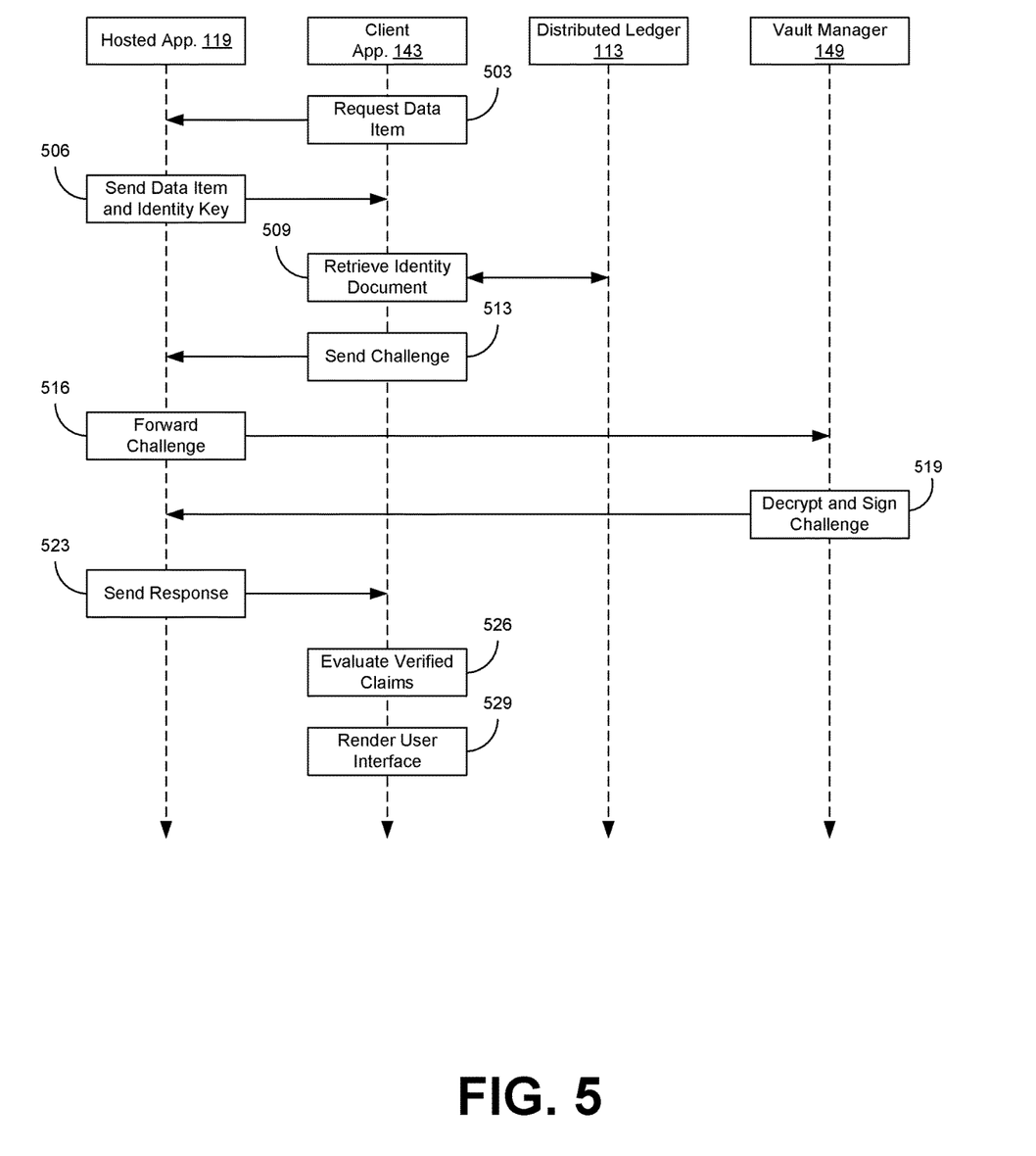
FIG. 5 is a sequence diagram illustrating one example of functionality implemented in the network environment of FIG. 1 according to various embodiments of the present disclosure.

Referring next to FIG. 5, shown is a sequence diagram that provides another example of the operation of the components of the network environment 100. It is understood that the sequence diagram of FIG. 5 provides merely an example of the many different types of functional arrangements that can be employed to implement the operation of the depicted portion of the network environment 100. As an alternative, the sequence diagram of FIG. 5 can be viewed as depicting an example of elements of a method implemented within the network environment 100.

Beginning with step 503, the client application 143 sends a request for a data item 133 to the hosted application 119. This could include, for example, a request for a file, a request for a webpage, etc.

At step 506, the hosted application 119 provides the data item 136 in response to the request, along with a respective identity key 131 identified in a respective authentication record 126. The identity key 131 could be provided using various custom protocols or extensions to existing protocols. For example, additional hypertext transport protocol (HTTP) headers could be included in the response to indicate the identity key associated with the data item 133.

Subsequently at step 509, the client application 143 recognizes the identity key 131 in the response and retrieves the respective identity document 136. For example, the client application 143 can use the identity key 131 to search for the respective identity document 136 stored in the distributed ledger 113 and retrieve it. In instances where multiple distributed ledgers 113 are used, the client application 143 can send the identity key 131 to a relay or resolver service, such as a DID resolver, to determine which distributed ledger 113 contains the identity document 136. In these instances, the relay or resolver service may retrieve the identity document 136 on behalf of the client application 143 and return it to the security service 121.

Then at step 513, the client application 143 can create and send a cryptographic challenge to the hosted application 119. Accordingly, the client application 143 can use the public key 163 in the identity document 136 retrieved at step 509 to encrypt a token or nonce for use as the cryptographic challenge, which can then be sent to the hosted application 119.

At step 516, the hosted application 119 can forward the cryptographic challenge to the vault manager 149. The cryptographic challenge can be forwarded as part of a request for the vault manager 149 to decrypt and sign the cryptographic challenge using the private key 166 associated with the identity key 131 linked to the data item 133 by the authentication record 126.

In response at step 519, the vault manager 149 can decrypt and sign the cryptographic challenge and provide the decrypted cryptographic challenge and signature for the cryptographic challenge to the hosted application 119. For example, the vault manager 149 can first retrieve the private key 166 of the key-pair 159 associated with the identity key 131 linked to the data item 133. The vault manager 149 can then decrypt the encrypted challenge to recreate the original token or nonce provided by the client application 143. The vault manager 149 can then sign the token or nonce with the private key 166 to prove that the owner of the private key 166 for the hosted application 119 decrypted the challenge instead of obtaining the unencrypted token or nonce through other approaches. The vault manager 149 could then provide the unencrypted token or nonce as well as the respective signature to the hosted application 119.

Next at step 523, the hosted application 119 can then send the unencrypted nonce or token and the signature for the nonce or token to the client application 143. This can indicate that the identity document 136 retrieved by the client application 143 is associated with the data item 133 and contains valid verified claims 169 concerning the data item 133.

Then at step 526, the client application 143 can evaluate the verified claims 169 contained in the identity document 136 retrieved at step 509. For example, the client application 143 may evaluate each claim 173 to determine what is asserted about the data item 133 (e.g., is it secure, does it contain malware, is the link to a valid site or an impostor site, who is the purported author of the file, etc.). The client application 143 may also confirm that the respective signature 176 for each claim 173 in the verified claim 169 is correct to ensure the each claim 173 is valid.

In some instances, the client application 143 can also determine whether it trusts the party making the assertion in the claim 173. For example, the signature 176 may specify the security service 121 that made the claim 173. One security service 121 may be more trusted by the client application 143 than another security service 121 (e.g., one security service 121 may have a history of being more thorough or being more accurate). Accordingly, the client application 143 may choose to disregard a particular claim 173 if it is made by a particular security service 121 or may require that multiple, untrusted security services 121 make the same assertion in their respective claims 173 in order for a particular assertion by an untrusted security service 121 be trusted.

Finally at step 529, the client application 143 renders a user interface 146 based at least in part on the claims 173 contained in the verified claim 169. In some implementations, only claims 173 in the verified claim 169 that are from trusted sources may be incorporated into the user interface 146. For example, the client application 143 may render a user interface 146 that displays the data item 133 along with an indication of the status of the data item 133. For example, the user interface could indicate that a website is secure, that a link is a valid link for a website, that a file does not contain malware, or that the author or distributor of a file is who he or she purports to be.

Figure 6:
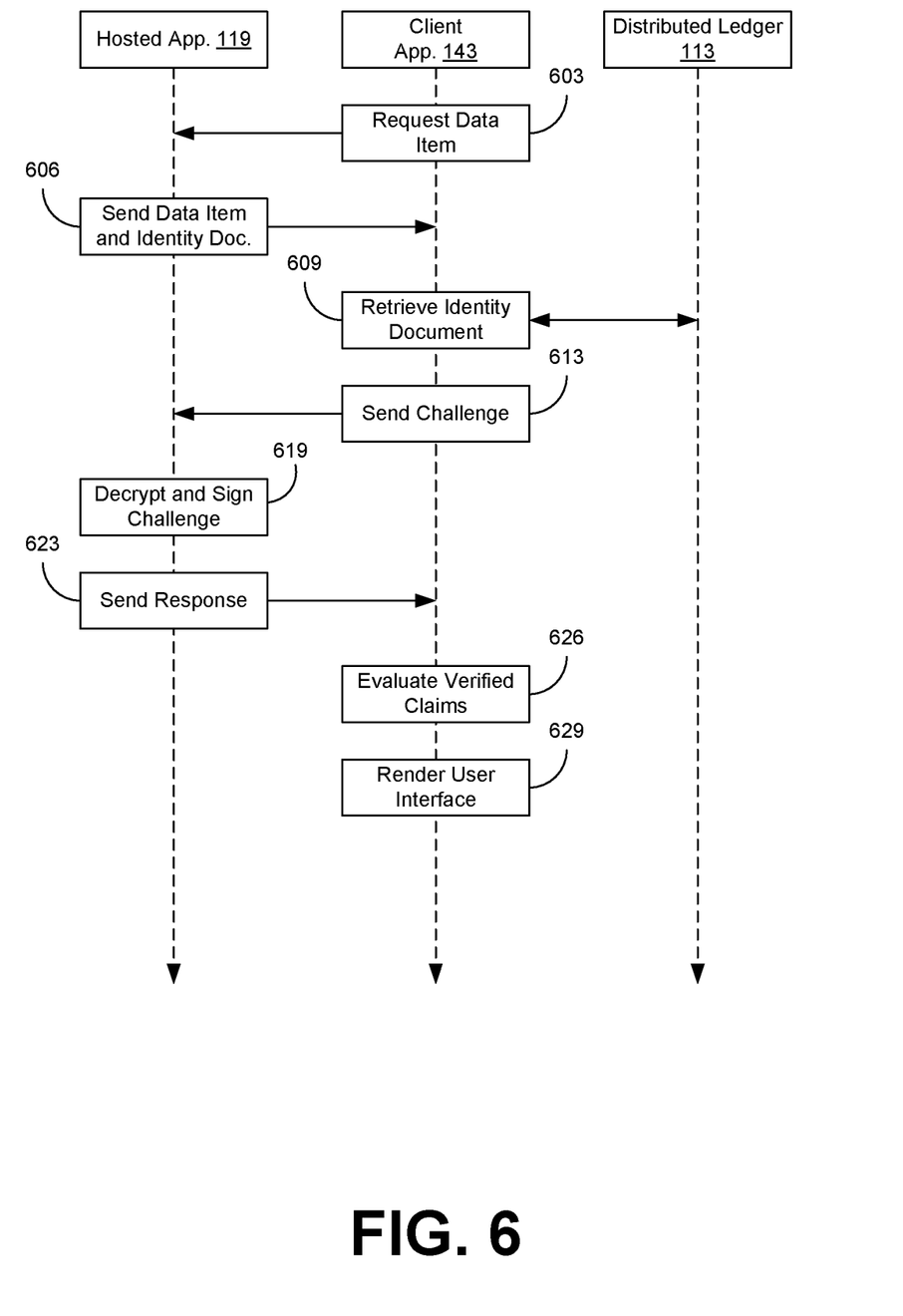
FIG. 6 is a sequence diagram illustrating one example of functionality implemented in the network environment of FIG. 1 according to various embodiments of the present disclosure.

Referring next to FIG. 6, shown is a sequence diagram that provides another example of the operation of the components of the network environment 100. It is understood that the sequence diagram of FIG. 6 provides merely an example of the many different types of functional arrangements that can be employed to implement the operation of the depicted portion of the network environment 100. As an alternative, the sequence diagram of FIG. 6 can be viewed as depicting an example of elements of a method implemented within the network environment 100.

It should be noted that the sequence diagram of FIG. 6 is similar in scope to that of FIG. 5. However, the sequence diagram of FIG. 5 depicts the use of a vault manager 149, while the sequence diagram of FIG. 6 depicts an alternative implementation which omits the use of the vault manager 149.

Beginning with step 603, the client application 143 sends a request for a data item 133 to the hosted application 119. This could include, for example, a request for a file, a request for a webpage, etc.

At step 606, the hosted application 119 provides the data item 136 in response, along with a respective identity key 131 identified in a respective authentication record 126. The identity key 131 could be provided using various custom protocols or extensions to existing protocols. For example, additional hypertext transport protocol (HTTP) headers could be included in the response to indicate the identity key associated with the data item 133.

Subsequently at step 609, the client application 143 recognizes the identity key 131 in the response and retrieves the respective identity document 136. For example, the client application 143 can use the identity key 131 to search for the respective identity document 136 stored in the distributed ledger 113 and retrieve it. In instances where multiple distributed ledgers 113 are used, the client application 143 can send the identity key 131 to a relay or resolver service, such as a DID resolver, to determine which distributed ledger 113 contains the identity document 136. In these instances, the relay or resolver service may retrieve the identity document 136 on behalf of the client application 143 and return it to the security service 121.

Then at step 613, the client application 143 can create and send a cryptographic challenge to the hosted application 119. Accordingly, the client application 143 can use the public key 163 in the identity document 136 retrieved at step 509 to encrypt a token or nonce for use as the cryptographic challenge, which can then be sent to the hosted application 119.

At step 619, the hosted application 119 can decrypt and sign the cryptographic challenge and provide the decrypted cryptographic challenge and signature for the cryptographic challenge to the hosted application 119. For example, the hosted application 119 can use the private key 166 of the key-pair 159 associated with the identity key 131 linked to the data item 133 to decrypt the encrypted challenge to recreate the original token or nonce provided by the client application 143. The hosted application 119 can then sign the token or nonce with the private key 166 to prove that the owner of the private key 166 for the hosted application 119 decrypted the challenge instead of obtaining the unencrypted token or nonce through other means.

Next at step 623, the hosted application 119 can then send the unencrypted nonce or token and the signature for the nonce or token to the client application 143. This can indicate that the identity document 136 retrieved by the client application 143 is associated with the data item 133 and contains valid verified claims 169 concerning the data item 133.

Then at step 626, the client application 143 can evaluate the verified claims 169 contained in the identity document 136 retrieved at step 609. For example, the client application 143 may evaluate each claim 173 to determine what is asserted about the data item 133 (e.g., is it secure, does it contain malware, is the link to a valid site or an impostor site, who is the purported author of the file, etc.). The client application 143 may also confirm that the respective signature 176 for each claim 173 in the verified claim 169 is correct to ensure the each claim 173 is valid.

In some instances, the client application 143 can also determine whether or not it trusts the party making the assertion in the claim 173. For example, the signature 176 may specify the security service 121 that made the claim 173. One security service 121 may be more trusted by the client application 143 than another security service 121 (e.g., one security service 121 may have a history of being more thorough or being more accurate). Accordingly, the client application 143 may choose to disregard a particular claim 173 if it is made by a particular security service 121 or may require that multiple, untrusted security services 121 make the same assertion in their respective claims 173 in order for a particular assertion by an untrusted security service 121 be trusted.

Finally at step 629, the client application 143 renders a user interface 146 based at least in part on the claims 173 contained in the verified claim 169. In some implementations, only claims 173 in the verified claim 169 that are from trusted sources may be incorporated into the user interface 146. For example, the client application 143 may render a user interface 146 that displays the data item 133 along with an indication of the status of the data item 133. For example, the user interface could indicate that a website is secure, that a link is a valid link for a website, that a file does not contain malware, or that the author or distributor of a file is who he or she purports to be.

Figure 7:
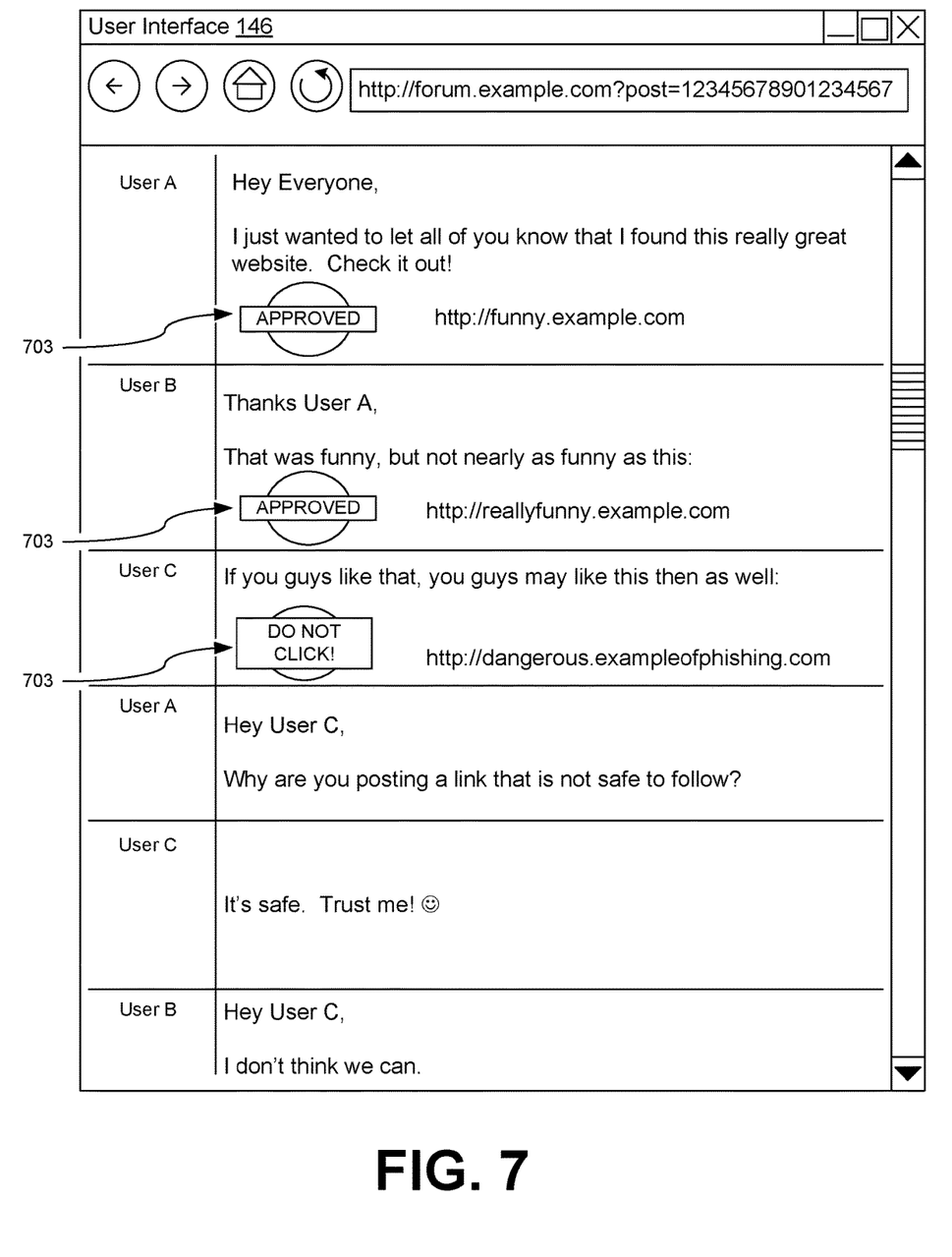
FIG. 7 is a pictorial diagram of an example user interface rendered by a client in the network environment of FIG. 1 according to various embodiments of the present disclosure.

FIG. 7 depicts an example of a user interface 146 rendered on the display 139 by the client application 143 according to various embodiments of the present disclosure. Although the user interface 146 depicted in FIG. 7 depicts one example of an implementation of the present disclosure, the principals disclosed in the user interface 146 of FIG. 7 could be adapted to other user interfaces 146 used for similar purposes.

The example of FIG. 7 depicts a user interface 146 rendered by a client application 143, such as a browser, that incorporates the result of the verification process depicted previously in FIG. 5 or FIG. 6. Displayed in the user interface 146 are multiple links that that have been verified using a process such as that depicted previously in FIG. 5 or FIG. 6. In response to evaluation of a verified claim 169 for each link, a user interface element 703 has been inserted next to each link to indicate the status of the link. For example, some links may have an indication that they are "Approved." This status could indicate that these links comply with all applicable verification rules 129, such as whether the links would direct a user to a website that impersonates a legitimate website or whether a website reachable by the links contains security vulnerabilities. In contrast, other links may have an instruction stating "DO NOT CLICK" to warn users that these links fail to comply with at least one applicable verification rule 129. All these user interface elements 703 contain illustrative examples of how information could be conveyed to a user, other approaches could be used as appropriate.

Figure 8:
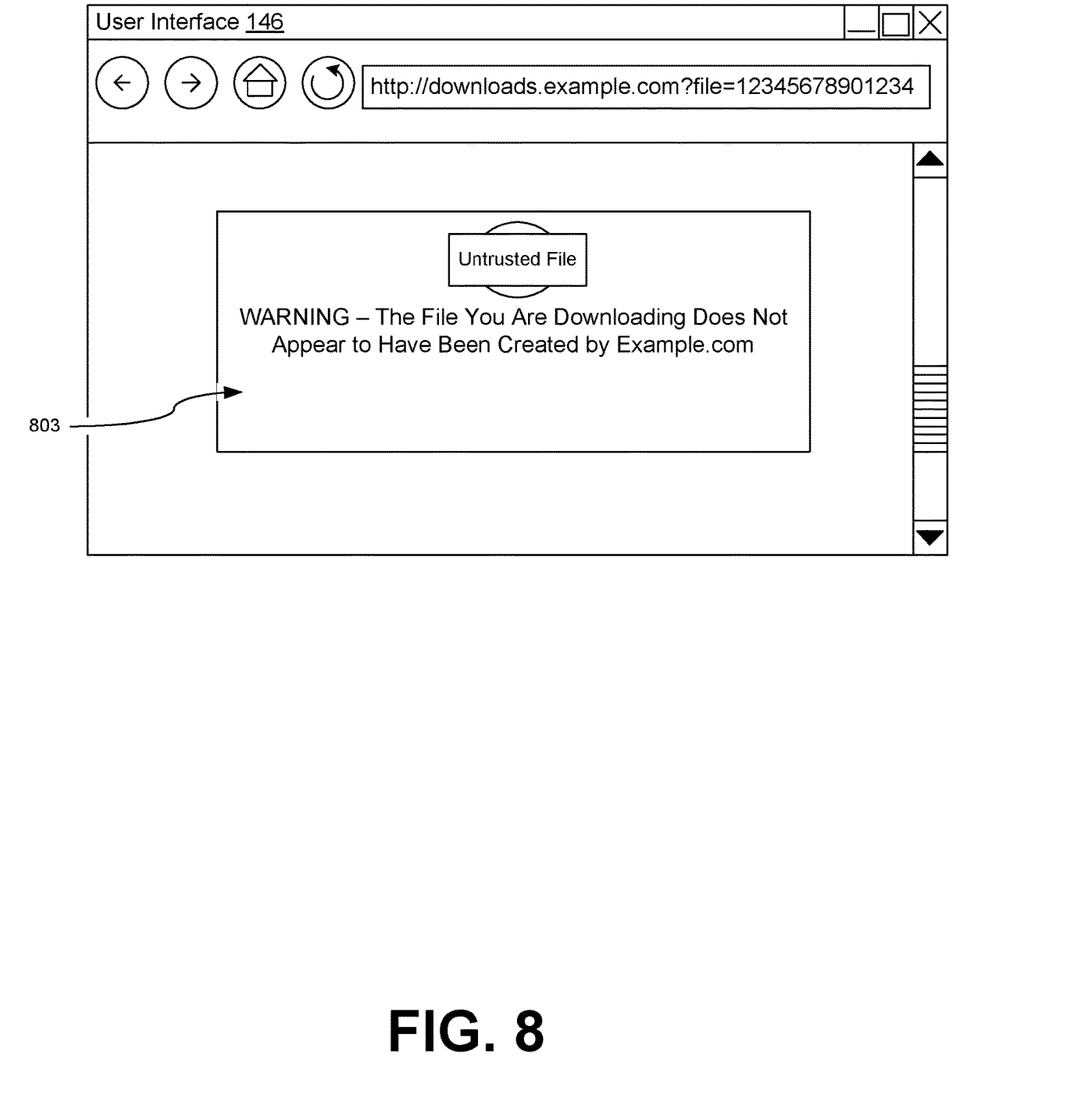
FIG. 8 is a pictorial diagram of an example user interface rendered by a client in the network environment of FIG. 1 according to various embodiments of the present disclosure.

FIG. 8 depicts an example of a user interface 146 rendered on the display 139 by the client application 143 according to various embodiments of the present disclosure. Although the user interface 146 depicted in FIG. 8 depicts one example of an implementation of the present disclosure, the principals disclosed in the user interface 146 of FIG. 8 could be adapted to other user interfaces 146 used for similar purposes.

The example of FIG. 8 depicts a user interface 146 rendered by a client application 143, such as a browser, that incorporates the result of the verification process depicted previously in FIG. 5 or FIG. 6. Displayed in the user interface 146 are multiple links that that have been verified using a process such as that depicted previously in FIG. 5 or FIG. 6. In response to evaluation of a verified claim 169 for file that a user is attempting to access, a dialog box 803 has been rendered to indicate the status of the file. Although any status could be rendered in the dialog box 803, some implementations may choose to only render a dialog box 803 if a file fails to comply with at least one verification rule 129. For example, a dialog box 803 might be rendered if a file contains malware or if a file appears not to originate from the purported author or distributor of the file.

A number of software components previously discussed are stored in the memory of the respective computing devices and are executable by the processor respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   generate an identity key for a data item;
   send a request for authentication of the data item to a security service, the request comprising the identity key and the data item;
   receive a verified claim for the data item from the security service;
   generate an identity document, the identity document comprising the identity key for the data item and the verified claim; and
   store the identity document in a distributed ledger.

2. The system of claim 1, wherein the machine-readable instructions, when executed by the computing device, further cause the computing device to at least:
   receive a request for the data item; and
   send a response to the request, the response comprising the data item and the identity key.

3. The system of claim 1, wherein:
   the identity key is a second identity key;
   the identity document is a second identity document;
   the request for authentication of the data item is a second request for authentication;
   the machine-readable instructions further cause the computing device to at least:
   send request for authentication of the identity of an operator of the machine-readable instructions to the authentication service;
   receive a first identity key and a verified claim from the authentication service;
   create a first identity document, the identity document comprising the identity key and the verified claim; and
   store the first identity document in a distributed ledger; and
   the second request for authentication of the data item is sent subsequent to the first identity document being stored in the distributed ledger.

4. The system of claim 1, wherein the machine-readable instructions, when executed by the processor, further cause the computing device to at least:
generate an asymmetric key-pair uniquely associated with the data item; and
wherein the identity document further comprises a public key of the asymmetric key-pair.

5. The system of claim 4, wherein the machine-readable instructions, when executed by the processor, further cause the computing device to at least:
receive a validation request that comprises an encrypted token encrypted with the public key;
decrypt the encrypted token using a private key of the asymmetric key-pair to generate an unencrypted token;
create a cryptographic signature of the unencrypted token using the private key; and
provide a validation response that comprises the unencrypted token and the cryptographic signature.

6. The system of claim 1, wherein the data item is a network address.

7. The system of claim 1, wherein the data item is a file.

8. A method, comprising:
receiving a verification request for a data item, the verification request comprising an identity key and the data item;
determining that the data item complies with at least one verification rule;
generating a verified claim for the data item, the verified claim indicating that the identity key is associated with the data item and that the data item complies with the at least one verification rule; and
providing the verified claim as a response to the request for authentication of the data item.

9. The method of claim 8, wherein:
the identity key is a second identity key;
the at least one verification rule indicates that the data item originates from an authenticated entity;
the authentication request further comprises a first identity key associated with the authenticated entity;
determining that the data item complies with the at least one verification rule further comprises verifying, based at least in part on the first identity key, that the authentication request originates from the authenticated entity; and
generating the verified claim occurs in response to verifying that the authentication request originates from the authenticated entity.

10. The method of claim 9, wherein verifying, based at least in part on the first identity key, that the authentication request originates from the authenticated entity further comprises:
retrieving an identity document associated with the first identity key, the identity document containing a public encryption key of a respective asymmetric key-pair;
encrypting a token with the public encryption key to create an encrypted token;
sending the encrypted token to an originating entity that sent the authentication request;
receiving the token and a digital signature created with a private key of the respective asymmetric key-pair; and
validating the digital signature with the public encryption key.

11. The method of claim 8, wherein:
the at least one verification rule indicates that the data item complies with a specified security policy; and
determining that the data item complies with the at least one verification rule further comprises performing a security analysis of the data item.

12. The method of claim 8, further comprising:
creating an identity document that comprises the identity key and the verified claim; and
registering the identity document with a distributed ledger.

13. The method of claim 8, wherein the data item is a network address.

14. The method of claim 8, wherein the data item is a file.

15. A non-transitory computer-readable medium comprising machine-readable instructions that, when executed by a processor of a computing device, cause the computing device to at least:
send a request to an application for a data item;
receive the data item and an identity key from the application, the identity key being linked with the data item;
retrieve an identity document identified by the identity key from a distributed ledger, the identity document containing at least one verified claim related to the data item;
verify the data item based at least in part on the identity document; and
render a user interface based at least in part on a result of a verification of the data item.

16. The non-transitory, computer-readable medium of claim 15, wherein the machine-readable instructions, when executed by the processor, further cause the computing device to at least:
encrypt a token using a public key included in the identity document to create an encrypted token;
send the encrypted token to the application;
receive the token from the application and a cryptographic signature associated with the token; and
verify the cryptographic signature.

17. The non-transitory, computer-readable medium of claim 15, wherein the machine-readable instructions that cause the computing device to verify the data item based at least in part on the identity document further cause the computing device to at least evaluate at least one claim in the verified claim, the at least one claim comprising an assertion regarding compliance of the data item with at least one verification rule.

18. The non-transitory, computer-readable medium of claim 17, wherein the machine-readable instructions that cause the computing device to at least evaluate the at least one claim further cause the computing device to determine that the claim is made by a trusted entity.

19. The non-transitory, computer-readable medium of claim 15, wherein the data item is a network address.

20. The non-transitory, computer-readable medium of claim 15, wherein the data item is a file.

* * * * *